United States Patent
Park

(10) Patent No.: US 8,910,471 B2
(45) Date of Patent: Dec. 16, 2014

(54) STRUCTURE OF EXHAUST PIPE FOR EXHAUST HEAT RECOVERY

(71) Applicant: Hyundai Motor Company, Seoul (KR)

(72) Inventor: Ki Chul Park, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 72 days.

(21) Appl. No.: 13/711,417

(22) Filed: Dec. 11, 2012

(65) Prior Publication Data

US 2014/0054008 A1   Feb. 27, 2014

(30) Foreign Application Priority Data

Aug. 22, 2012   (KR) .................. 10-2012-0091909

(51) Int. Cl.
| F28F 9/00 | (2006.01) |
| F28F 1/08 | (2006.01) |
| F28D 7/10 | (2006.01) |
| F01N 5/02 | (2006.01) |
| F28F 13/12 | (2006.01) |

(52) U.S. Cl.
CPC ... *F28F 9/00* (2013.01); *F28F 1/08* (2013.01); *F28D 7/103* (2013.01); *Y02T 10/166* (2013.01); *Y02T 10/16* (2013.01); *F01N 5/02* (2013.01); *F28F 13/12* (2013.01); *F28F 2250/06* (2013.01)
USPC ... 60/320; 237/12.1; 237/12.3 R; 237/12.3 A; 237/12.3 B; 237/12.3 C; 165/41; 165/103

(58) Field of Classification Search
CPC ............... F28F 9/00; F28F 13/12; F28F 1/08; F01N 5/02; F28D 7/103
USPC ..... 60/320; 237/12.1, 12.3 R, 12.3 A, 12.3 B, 237/12.3 C; 165/41, 103
See application file for complete search history.

(56) References Cited

U.S. PATENT DOCUMENTS

| 6,178,744 | B1 * | 1/2001 | Perset ........................... 60/288 |
| 7,255,096 | B2 * | 8/2007 | Craig et al. .............. 123/568.12 |
| 2005/0006074 | A1 | 1/2005 | Pantow et al. |
| 2009/0038302 | A1 * | 2/2009 | Yamada et al. ................. 60/320 |

FOREIGN PATENT DOCUMENTS

| JP | 2006-170607 A | 6/2006 |
| JP | 2008-14295 A | 1/2008 |
| KR | 10-2011-0121942 A | 11/2011 |
| KR | 10-2012-001428 A | 1/2012 |
| WO | WO 2009/074147 A2 | 6/2009 |

* cited by examiner

*Primary Examiner* — Thomas Denion
*Assistant Examiner* — Brandon Lee
(74) *Attorney, Agent, or Firm* — Morgan, Lewis & Bockius LLP

(57) ABSTRACT

An exhaust pipe heats coolant with heat of exhaust gas. The structure of the exhaust pipe can increase heat exchange efficiency because a flow direction of the coolant is arranged to be opposite to a flow direction of the exhaust gas. The coolant can smoothly flow inside the housing, because density of the coolant decreases as the coolant is heated while flowing in a lower side of the housing and flowing out of an upper side of the housing. In addition, the heat transfer pipe of which one surface is in contact with the exhaust gas and the other side is in contact with the coolant has wrinkle portions which are formed on a surface of the heat transfer pipe, where heat exchange is performed, and thereby, a heat exchange area can be increased and the coolant can be more rapidly heated without increasing a size of the housing.

3 Claims, 3 Drawing Sheets

<CROSS-SECTIONAL LENGTH OF HEAT EXCHANGE PIPE IN RELATED ART>

<CROSS-SECTIONAL LENGTH OF HEAT EXCHANGE PIPE OF PRESENT INVENTION>

$10\sqrt{2} \times L = 14.14L$
(40.1% INCREASE IN CROSS SECTION)

STRUCTURE OF EXHAUST PIPE FOR EXHAUST HEAT RECOVERY

CROSS-REFERENCE TO RELATED APPLICATIONS

The present application claims priority of Korean Patent Application Number 10-2012-91909 filed Aug. 22, 2012, the entire contents of which application is incorporated herein for all purposes by this reference.

BACKGROUND OF INVENTION

1. Field of Invention

The present invention relates to a structure of an exhaust pipe for exhaust heat recovery, and more particularly to a structure of an exhaust pipe for exhaust heat recovery, which can more rapidly increase a temperature of coolant by increasing an area where heat exchange is performed between exhaust heat of exhaust gas and heat of a cold coolant, and arranging a flow direction of the coolant to be opposite to a flow direction of the exhaust gas.

2. Description of Related Art

In order to allow an engine of a vehicle exposed to a cold air temperature in a winter season to normally operate and to increase combustion efficiency of fuel, warming-up is required prior to driving or during an initial driving period.

An exhaust heat recovery apparatus is an apparatus which rapidly heats cold coolant with waste exhaust heat during an initial driving period in a winter season. The exhaust heat recovery apparatus has been developed to improve fuel efficiency by reducing friction loss inside the engine by shortening the warming-up time of the engine.

The exhaust heat recovery apparatus in the related art is shown in FIG. 1. Referring to FIG. 1, a housing 2 in a barrel shape having an enlarged diameter is mounted at a predetermined position of an exhaust pipe 1 through which exhaust gas generated in the engine flows.

In addition, an inlet and an outlet, through which the coolant (circulating in the engine and a radiator) flows in and flows out, are respectively formed in the housing 2, and heat transfer plates 3 are arranged inside the housing 2 to form channels through which the coolant flows. Further, a bypass valve 4 is coupled to the exhaust pipe positioned inside the housing 2 so as to open and close the exhaust pipe 1 (based on electrical signals), and a hole 4a is formed in a surface of the exhaust pipe inside the housing 2. Therefore, when the bypass valve 4 is closed, a path (depicted by an arrow) is formed so that the exhaust gas can flow into a space where the heat transfer plates 3 are positioned from the inside of the housing 2.

Therefore, when the engine is at a normal temperature, the bypass valve 4 is opened so that a large amount of the exhaust gas flows (toward the outlet) without being in contact with the heat transfer plates 3. Further, when the engine is at a low temperature, the bypass valve 4 is closed so that the coolant circulates inside the housing 2 so as to be heated.

However, in the related art, an area where the heat exchange is performed is limited because the heat transfer plate 3 has a simple pipe shape, and flow resistance is caused because flow paths of the exhaust gas are not simple.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a structure of an exhaust pipe for exhaust heat recovery, having advantages of flowing exhaust gas more efficiently by increasing an area, where heat exchange is performed inducing a vortex flow) without increasing the size of a housing, and of heating coolant more rapidly by setting a flow direction of the coolant to be opposite to a flow direction of the exhaust gas.

Various aspects of the present invention provide for a structure of an exhaust pipe for exhaust heat recovery, which heats coolant with heat of exhaust gas, the structure including: a housing connected to the exhaust pipe so that the exhaust gas flows from a front side to a rear side, and including a first nipple through which the coolant flows in, and a second nipple through which the coolant flows out; and heat transfer pipes mounted inside the housing while a plurality of heat transfer pipes which is different in diameter is coupled so that coolant paths through which the coolant flows are formed so as to form a plurality of layers as the first nipple and the second nipple are opened inside the housing, wherein exhaust gas paths through which the exhaust gas flows are formed between the neighboring coolant paths so as to form layers, and the first nipple is disposed at a rear side of the second nipple. The first nipple is formed at a lower end of the housing, and the second nipple is formed at an upper end of the housing.

Further, the heat transfer pipe may have wrinkle portions which protrude from a surface of the heat transfer pipe. The wrinkle portions may be formed by continuously bending the heat transfer pipe so that concave portions and convex portions are repeatedly formed on an inner circumferential surface and an outer circumferential surface of the heat transfer pipe.

A bypass valve may be coupled at the heat transfer pipe which is disposed at an innermost position, among the heat transfer pipes, and opens and closes the heat transfer pipe which is disposed at the innermost position.

The concave portions and the convex portions formed on the wrinkle portions, may include: a first wrinkle portion formed to have a shape in which one side in a longitudinal direction of the exhaust pipe is biased toward the front side and the other side is biased toward the rear side of the exhaust gas; and a second wrinkle portion connected to the first wrinkle portion and formed to have a shape biased in a direction opposite to the biased direction of the first wrinkle portion so that the shape of the first wrinkle portion and the shape of the second wrinkle portion are symmetric with each other with respect to a longitudinal axis of the exhaust pipe. The wrinkle portions may have a herringbone pattern.

Meanwhile, the heat transfer pipe may be formed in a shape in which the first wrinkle portion and the second wrinkle portion are repeatedly connected to each other along the circumference. Two neighboring heat transfer pipes respectively arranged at inner and outer sides may be mounted so that the first wrinkle portion of the heat transfer pipe positioned at the inner side faces the second wrinkle portion of the heat transfer pipe positioned at the outer side.

The structure of the exhaust pipe of the present invention can increase heat exchange efficiency because a flow direction of the coolant is arranged to be opposite to a flow direction of the exhaust gas. The coolant can smoothly flow inside the housing, because density of the coolant decreases as the coolant is heated while flowing in a lower side of the housing and flowing out of an upper side of the housing.

In addition, the heat transfer pipe of which one surface may be in contact with the exhaust gas and the other side may be in contact with the coolant has wrinkle portions which may be formed on a surface of the heat transfer pipe, where heat exchange may be performed, and thereby, a heat exchange area can be increased and the coolant can be more rapidly heated without increasing a size of the housing.

A vortex flow may be generated when the exhaust gas flows because the wrinkle portions include the first wrinkle portion and the second wrinkle portion which are symmetric with each other so as to form a herringbone pattern, and thereby, a deterioration of engine output (due to flow resistance of the exhaust gas) can be prevented.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
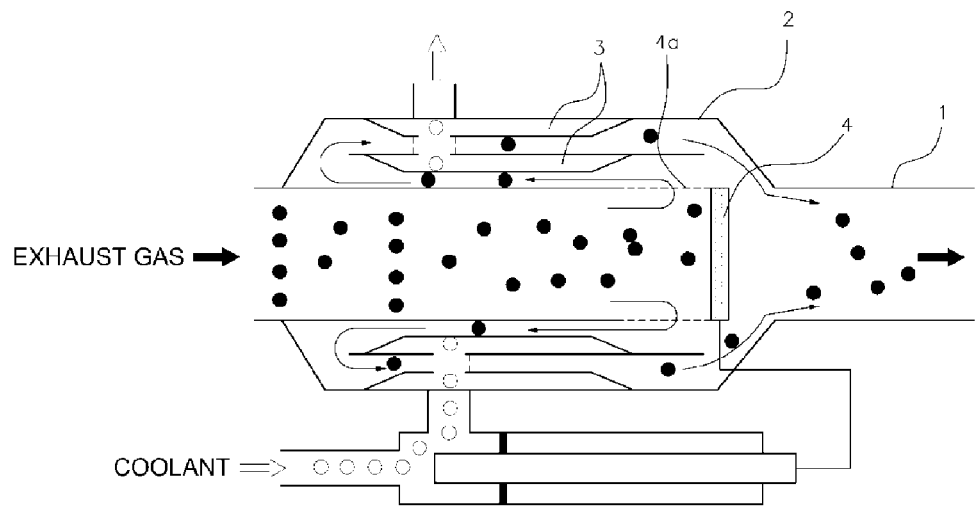
FIG. 1 is a cross-sectional view illustrating a simplified shape of an exhaust pipe for exhaust heat recovery in the related art.
Figure 2:
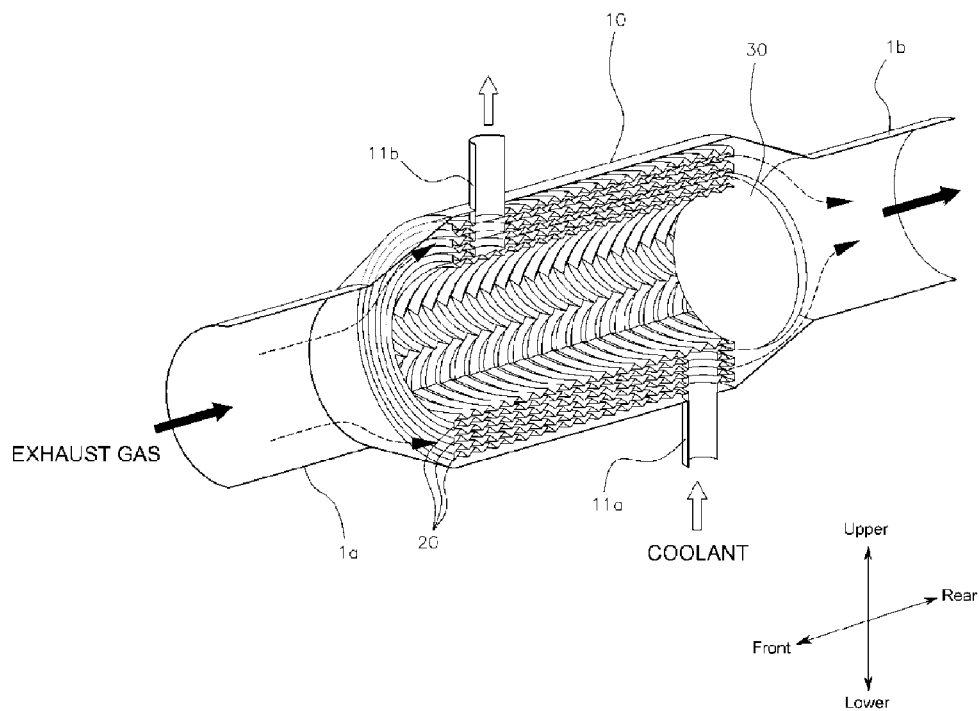
FIG. 2 is a perspective view illustrating an exemplary exhaust pipe for exhaust heat recovery, which is cut along a longitudinal direction, according to the present invention.
Figure 3:
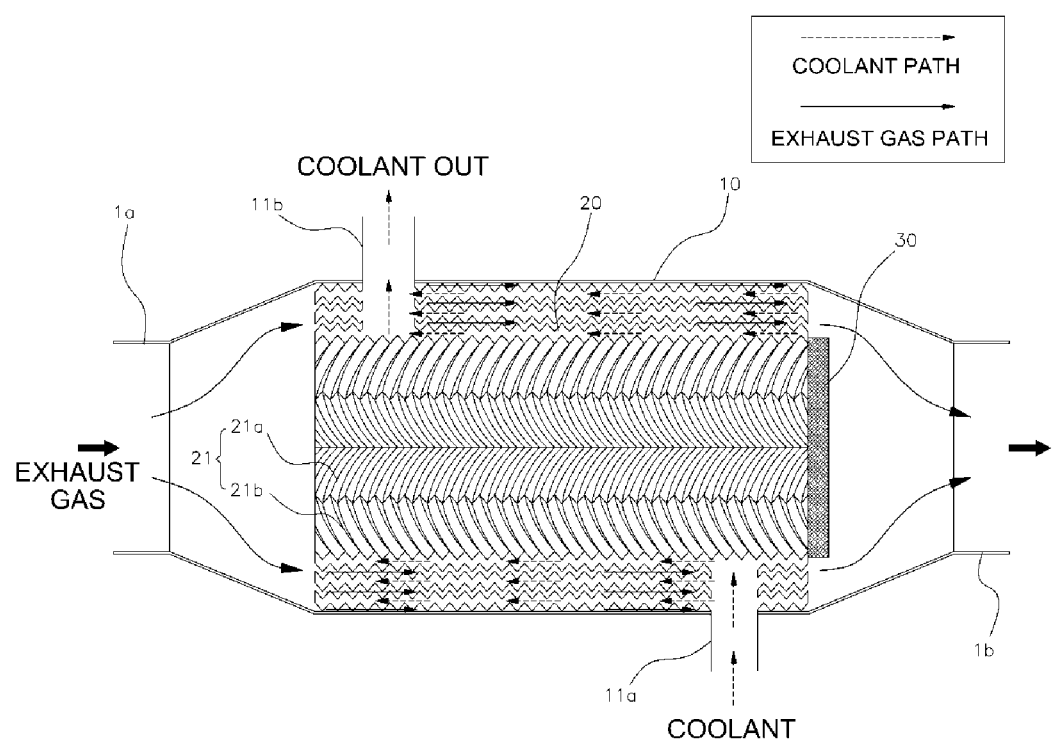
FIG. 3 is a cross-sectional view illustrating a cross section of an exemplary exhaust pipe for exhaust heat recovery according to the present invention.

Referring to FIGS. 2 and 3, an exhaust pipe (1: 1a, 1b) of the present invention has a structure in which a housing 10 and a plurality of heat transfer pipes 20 are mounted so as to heat coolant with heat of the exhaust gas.

The housing 10 has a barrel or pipe shape having a more enlarged diameter than the exhaust pipe 1. Further, the housing 10 is connected to a predetermined position of the exhaust pipe or is integrally and/or monolithically formed with a muffler or the like so that the exhaust gas flows in a forward and backward direction (a longitudinal direction).

The housing 10 includes a first nipple 11a, which is an inlet for the coolant, and a second nipple 11b, which is an outlet, so that the coolant (circulating in an engine and a radiator) flows in or flows out. In various embodiments of the present invention, the first nipple 11a is disposed at a rear side of the second nipple 11b. The first nipple 11a is formed at a lower end of the housing 10 and the second nipple 11b is formed at an upper end of the housing 10 (in consideration of a density decrease of the heated coolant).

Further, a plurality of heat transfer pipes 20, which is different in diameter, is mounted inside the housing 10 so as to form channels (paths) therebetween as the first nipple 11a, which is an inlet for the coolant, and the second nipple 11b, which is an outlet are opened inside the housing 10. Therefore, coolant paths through which the coolant flows are formed (radially inside the housing) between the heat transfer pipes 20, so as to form a plurality of layers that is different in diameter.

For example, the coolant paths may be formed between the heat transfer pipes 20 by joining or sealing one ends and the other ends of the heat transfer pipes 20 with ends of the inwardly neighboring heat transfer pipes 20 or ends of the outwardly neighboring heat transfer pipes 20 (by welding or the like) so as to sequentially cross each other, and by additionally forming paths which connect the heat transfer pipes 20 so that the coolant flows (in a vertical direction), as shown in FIG. 2.

Therefore, the coolant paths are formed inside the housing 10 so as to form the layers (which are gradually enlarged along the circumference). Here, exhaust gas paths through which the exhaust gas flows are formed between the neighboring coolant paths so as to form layers. Namely, as depicted by the arrows in FIG. 3, the exhaust gas flows on and below the coolant, and the coolant flows on and below the exhaust gas.

Meanwhile, the heat transfer pipe 20 of the present invention has wrinkle portions 21 which protrude from a surface of the heat transfer pipe 20. As illustrated, the wrinkle portions 21 are formed by continuously bending the heat transfer pipe 20, (so as to form a cross-sectional shape shown in FIG. 4), so that concave portions and convex portions are repeatedly formed (for example, in a shape in which recesses and projections are repeatedly formed like a saw tooth, a sine wave or the like) on an inner circumferential surface and an outer circumferential surface of the heat transfer pipe 20.

Further, the wrinkle portions 21 of various embodiments of the present invention include a first wrinkle portion 21a and a second wrinkle portion 21b (so as to form a herringbone shape). Namely, the concave portions and the convex portions formed on the wrinkle portions 21 include: the first wrinkle portion 21a formed to have a shape in which one side in a forward and backward direction (a longitudinal direction) of the exhaust pipe 1 is biased toward an inlet 1a for the exhaust gas (namely, toward a front side), and the other side is biased toward an outlet 1b for the exhaust gas (namely, toward a rear side); and the second wrinkle portion 21b connected to the first wrinkle portion 21a and formed to have a shape biased in a direction opposite to the biased direction of the first wrinkle portion 21a so that the shape of the first wrinkle portion 21a and the shape of the second wrinkle portion 21b are symmetric with each other with respect to a longitudinal axis of the exhaust pipe 1.

Figure 4:
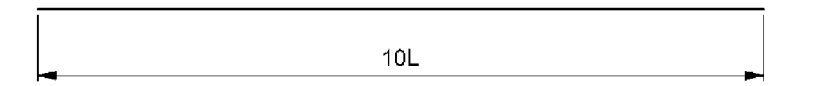
FIG. 4 is a view illustrating a simplified cross-sectional length of a heat transfer pipe in the related art and a simplified cross-sectional length of an exemplary heat transfer pipe of the present invention.
Figure 4:
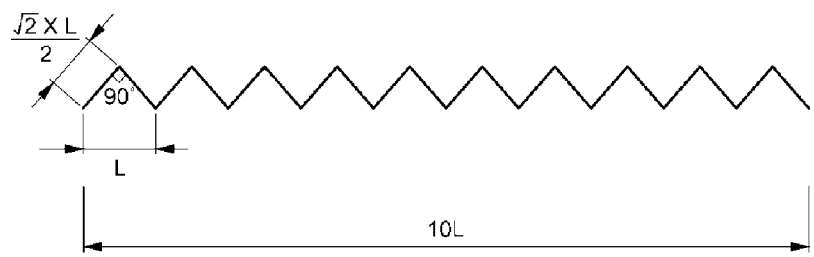

As shown in FIG. 4, the wrinkle portions 21 having the herringbone pattern not only can increase a heat exchange area by increasing a cross-sectional length (compared to a structure in the related art), but also can increase flow velocity by inducing a vortex flow of the flowing exhaust gas and coolant.

Meanwhile, in order to more efficiently induce the vortex flow, in various embodiments of the present invention, different shaped portions of the neighboring heat transfer pipes 20 face each other at a portion where the neighboring heat transfer pipes 20 face each other in a vertical direction.

That is, the heat transfer pipe 20 of the present invention is formed in a shape in which the first wrinkle portion 21a and the second wrinkle portion 21b are repeatedly connected to each other along the circumference. Here, two neighboring heat transfer pipes 20 respectively arranged at inner and outer sides are mounted so that the first wrinkle portion 21a of the heat transfer pipe positioned at the inner side faces the second wrinkle portion 21b of the heat transfer pipe 20 positioned at the outer side.

Meanwhile, in various embodiments of the present invention, a bypass valve 30 is additionally provided so that the exhaust gas may rapidly flow when the engine is at a normal temperature, and the heat exchange may be more efficiently performed between the exhaust gas and the coolant when the engine is at a low temperature.

That is, as illustrated in FIGS. 2 and 3, the bypass valve 30 is mounted at the heat transfer pipe which is disposed at an innermost position, among the heat transfer pipes 20, and configured to open and close the heat transfer pipe which is disposed at the innermost position (based on electrical signals).

Figure 5:
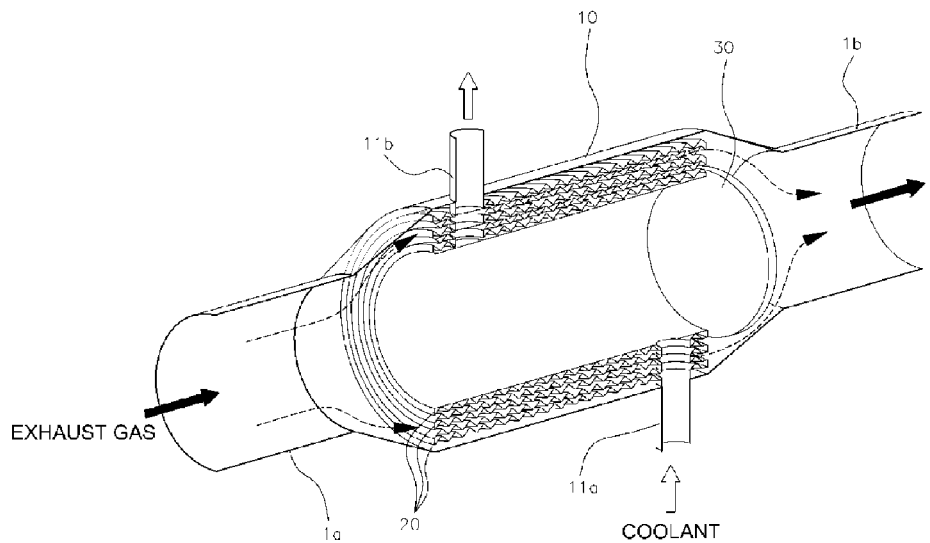
FIG. 5 is a perspective view illustrating an exemplary exhaust pipe for exhaust heat recovery, which is cut along a longitudinal direction, according to the present invention.

In addition, in order to prevent flow resistance or flow velocity of the exhaust gas from being suddenly changed in the housing 10, an inner circumferential surface of the heat transfer pipe disposed at the innermost position may be formed as a smooth surface without the wrinkle portion 21, as illustrated in FIG. 5.

Furthermore, by forming the inner surface as a smooth surface as described above, the heat transfer pipe disposed at the innermost position functions as a thermal insulation layer so that the coolant is not additionally heated when the bypass valve 30 is opened as the coolant is heated up to a predetermined temperature.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of an exhaust pipe for exhaust heat recovery, which heats coolant with heat of exhaust gas, the structure comprising:
   a housing connected to the exhaust pipe so that the exhaust gas flows from a front side to a rear side, and including a first nipple through which the coolant flows in, and a second nipple through which the coolant flows out; and
   a plurality of heat transfer pipes having different diameters, wherein the heat transfer pipes are mounted inside the housing and coolant paths that coolant flows through are formed between the heat transfer pipes and the first nipple and the second nipple are opened inside the housing and the coolant paths,
   wherein exhaust gas paths through which the exhaust gas flows are formed between the neighboring coolant paths so as to form layers, and the first nipple is disposed at a rear side of the second nipple,
   wherein the first nipple is formed at a lower end of the housing, and the second nipple is formed at an upper end of the housing,
   wherein each heat transfer pipe has wrinkle portions which protrude from a surface of each heat transfer pipe; and
   wherein concave portions and convex portions formed on the wrinkle portions comprise:
      a first wrinkle portion formed to have a shape in which one side in a longitudinal direction of the exhaust pipe is biased toward the front side and another side is biased toward the rear side of the exhaust gas; and
      a second wrinkle portion connected to the first wrinkle portion and formed to have a shape biased in a direction opposite to the biased direction of the first wrinkle portion so that the shape of the first wrinkle portion and the shape of the second wrinkle portion are symmetric with each other with respect to a longitudinal axis of the exhaust pipe.

2. The structure of claim 1, wherein a bypass valve is coupled at a heat transfer pipe which is disposed at an innermost position, among the heat transfer pipes, and opens and closes the heat transfer pipe which is disposed at the innermost position.

3. The structure of claim 1, wherein the wrinkle portions are formed by continuously bending each heat transfer pipe so that concave portions and convex portions are repeatedly formed on an inner circumferential surface and an outer circumferential surface of each heat transfer pipe.

* * * * *